United States Patent
Choe et al.

(10) Patent No.: US 9,372,828 B2
(45) Date of Patent: Jun. 21, 2016

(54) METHOD AND DEVICE FOR INPUTTING EQUATION

(75) Inventors: Seung Lock Choe, Seoul (KR); Nam Sook Wee, Seoul (KR); Doo Seok Lee, Seoul (KR); Jung Kyo Sohn, Seoul (KR); Haeng Moon Kim, Gyeonggi-Do (KR); Yong Gil Park, Gyeonggi-Do (KR); Keun Tae Park, Gyeonggi-Do (KR); Dong Hahk Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 476 days.

(21) Appl. No.: 13/883,496

(22) PCT Filed: Nov. 3, 2011

(86) PCT No.: PCT/KR2011/008332
§ 371 (c)(1),
(2), (4) Date: Jul. 18, 2013

(87) PCT Pub. No.: WO2012/060645
PCT Pub. Date: May 10, 2012

(65) Prior Publication Data
US 2013/0290390 A1  Oct. 31, 2013

(30) Foreign Application Priority Data
Nov. 3, 2010 (KR) .................. 10-2010-0108875

(51) Int. Cl.
*G06F 15/18* (2006.01)
*G06F 15/02* (2006.01)
*G06F 17/10* (2006.01)
*G06F 17/21* (2006.01)

(52) U.S. Cl.
CPC ............... *G06F 15/18* (2013.01); *G06F 15/02* (2013.01); *G06F 17/10* (2013.01); *G06F 17/215* (2013.01)

(58) Field of Classification Search
CPC ... G06F 15/02; G06F 15/0225; G06F 15/025; G06F 15/18
See application file for complete search history.

(56) References Cited

U.S. PATENT DOCUMENTS

| | | | |
|---|---|---|---|
| 6,195,671 B1* | 2/2001 | Ito ......................... | G06F 3/0233 708/131 |
| 2008/0244403 A1* | 10/2008 | Kaneko .................. | G06F 9/4446 715/711 |
| 2013/0042197 A1* | 2/2013 | Amare .................. | G06F 15/025 715/777 |

FOREIGN PATENT DOCUMENTS

| KR | 1020060064965 | 6/2006 |
|---|---|---|
| KR | 100963976 | 6/2009 |

(Continued)

OTHER PUBLICATIONS

Korean Office Action dated Apr. 28, 2014.

(Continued)

*Primary Examiner* — Chuong D Ngo
(74) *Attorney, Agent, or Firm* — Hauptman Ham, LLP (57) ABSTRACT

The present disclosure relates to a method and apparatus for inputting equations. An equation input apparatus includes a learning context recognizer for extracting learning context information regarding a learner; a target equation group extractor for generating a target equation group including target mathematical symbols based on the extracted learning context information; and a predicted equation provider for providing a predicted mathematical symbol list relating to information, input or selected from the target equation group by user command, and for reflecting an equation selected from the predicted mathematical symbol list in the input or selected information.

9 Claims, 4 Drawing Sheets

(56) References Cited

FOREIGN PATENT DOCUMENTS

| KR | 1020090071710 A | 7/2009 |
|---|---|---|
| KR | 100921690 | 10/2009 |
| KR | 1020090115425 A | 11/2009 |
| KR | 100952197 | 4/2010 |
| KR | 100981653 | 9/2010 |

OTHER PUBLICATIONS

Zhao Yan-Juan et al., "Implementation of MathML-based Web Mathematical Expressions Editor", Computer Engineering, Apr. 2008, pp. 76-78, vol. 34, No. 7, China Academic Journal Electronic Publishing House, China.

"After the Journey to the West, Excel Function (VII), Sharp Eyes, Skillfully Catching Bugs in Excel Function", Computer Fan, Oct. 1, 2005, pp. 61-63, vol. 19, China Academic Journal Electronic Publishing House, China.

Chinese Office Action mailed on Mar. 23, 2015 for Corresponding Chinese application No. CN103201733A.

International Search Report mailed May 16, 2012 for PCT/KR2011/008332.

\* cited by examiner

METHOD AND DEVICE FOR INPUTTING EQUATION

CROSS-REFERENCE TO RELATED APPLICATION

The present application is a national phase of International Patent Application No. PCT/KR2011/008332, filed Nov. 3, 2011, which is based on and claims priority to Korean Patent Application No. 10-2010-0108875, filed on Nov. 3, 2010. The disclosures of the above-listed applications are hereby incorporated by reference in their entirety.

FIELD

The present disclosure relates to a method and apparatus for providing mathematical symbols related to mathematical formulas or equations.

BACKGROUND

The statements in this section merely provide background information related to the present disclosure and may not constitute prior art.

Typical methods of inputting equations include a LaTex method in which a user directly describes equations through specific commands as in the case of a coding operation, a method for composing equations by selecting mathematical symbol buttons, a method for inputting equations through a portion of the LaTex commands, and CAS in which equations are input with commands or selected mathematical symbol buttons.

The inventor(s) have experienced that the equation composing method with the selected mathematical symbol buttons might take much time for the user to find the wanted mathematical symbols because all the buttons are displayed on a screen to permit the user to express all the possible equations. In addition, the inventor(s) have experienced that the method of inputting equations through command inputs might require the user to learn all the commands presented in order to express various equations.

SUMMARY

In accordance with some embodiments, an equation input apparatus comprises a learning context recognizer, a target equation group extractor and a predicted equation provider. The learning context recognizer is configured to extract learning context information regarding a learner (mostly used as referring to a same person as "user" in the description). The target equation group extractor is configured to generate a target equation group including target mathematical symbols based on the extracted learning context information. And the predicted equation provider is configured to provide a predicted mathematical symbol list relating to information inputted or selected from the target equation group by a learner (or a user) command, and reflect an equation selected from the predicted mathematical symbol list in the inputted or selected information.

In accordance with some embodiments, an equation input apparatus comprises a learning context recognizer, a target equation group extractor, a predicted equation provider, a typo indicator, an equation builder, an equation layout provider, and an equation preview provider. The learning context recognizer is configured to extract learning context information regarding a learner who is provided with learning content information. The target equation group extractor is configured to generate a target equation group including target mathematical symbols based on the extracted learning context information. The predicted equation provider is configured to provide a predicted mathematical symbol list relating to information inputted or selected from the target equation group by a learner command, and reflect an equation selected from the predicted mathematical symbol list in the inputted or selected information. The typo indicator is configured to check whether equation information or text information inputted or selected by the learner command is a typo or not based on prestored decision information and, if the typo is confirmed, to automatically indicate a typo state of the equation information or text information. The equation builder configured to autocomplete the inputted or selected information into equation information which is most frequently used in the predicted mathematical symbol list. The equation layout provider configured to provide a specific equation layout in accordance with an equation included in the target equation group. And the equation preview provider configured to provide equation information, inputted or selected by the learner command, in a preview format.

In accordance with some embodiments, the equation input apparatus performs a method for inputting an equation. The equation input apparatus is configured to extract learning context information regarding a learner; to generate a target equation group including target mathematical symbols based on the extracted learning context information; and to provide a predicted mathematical symbol list relating to information inputted or selected from the target equation group by a learner command, and to reflect an equation selected from the predicted mathematical symbol list in the inputted or selected information to provide a predicted equation.

DETAILED DESCRIPTION

The present disclosure provides a method and device for inputting equations in which an equation input window is configured according to a learner's learning context based on a feedback of the learner (mostly used as referring to a same person as "user") on a learning content.

Figure 1:
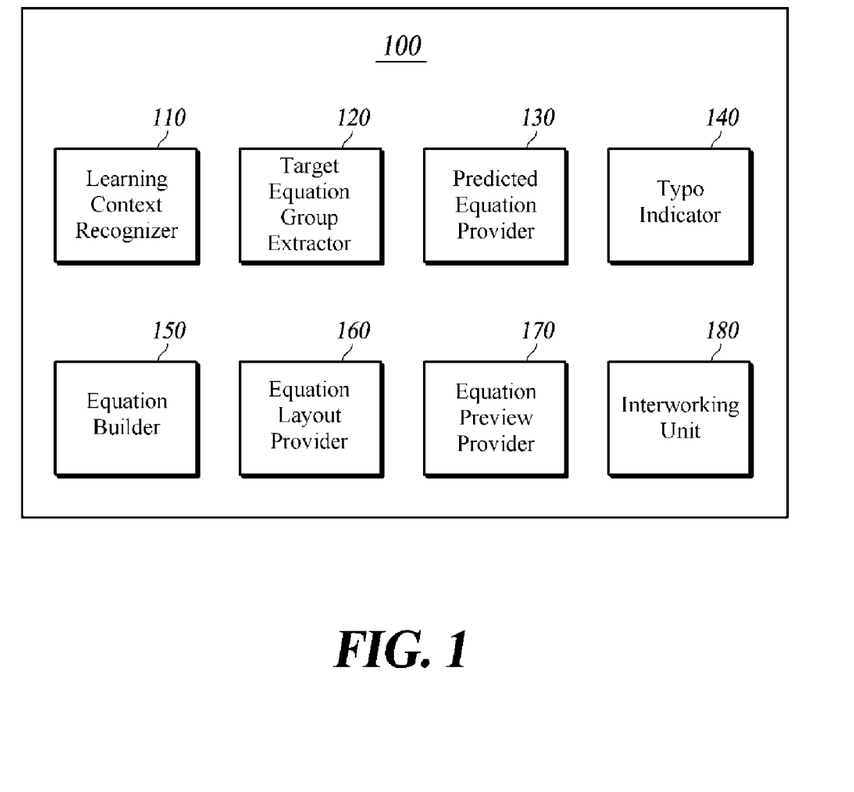
FIG. 1 is a schematic block diagram of an apparatus for inputting an equation according to at least one embodiment of the present disclosure.

FIG. 1 is a schematic block diagram of an apparatus for inputting an equation according to at least one embodiment of the present disclosure.

An equation input apparatus 100 is implemented with one or more modules combined with at least one hardware element and such at least one software as an equation editor and/or equation input application which is a separate application program. That is, the equation input application is a software application which recognizes learning context from and based on a user command or operation, extracts a target equation group based on the recognized learning context, and thereafter provides a predicted equation associated with the user command or operation. For example, such an equation input application may be implemented or manufactured in accordance with various OS (operating system) environments such as Windows, Linux, iOS, Android, and Windows Phone 7.

Such an equation input application is installed in a terminal including at least one of tablet PC (personal computer), laptop, desktop PC, smartphone, PDA (personal digital assistant), and mobile communication terminal. In addition, the present disclosure can individually implement a function of running the equation input application for allowing an equation to be inputted through a user command or terminal command; and a function of displaying the relevant contents on the terminal.

In the meantime, when such an equation input application is installed in a server, the equation input application recognizes learning context through a user operation or command, extracts a target equation group based on the recognized learning context, and thereafter provides predicted equations by using respective external devices (for example, terminals) which interwork with the server. The server described herein has the same configuration as that of a typical web server or network server in terms of hardware. However, in terms of software, the server includes a program module which is implemented by various programming languages such as C, C++, Java, Visual Basic, Visual C and the like. In addition, the server may be implemented in the form of a web server or a network server. The web server represents a computer system which is generally connected to many anonymous clients and/or other servers through an open computer network such as the Internet, receives operation requests from clients or other web servers, and obtains and provides results for the requested operations; and computer software (web server program) which is installed on the computer system therefor. However, in addition to such web server program, the server may comprehensively include a series of application programs which are operable on the web server and, in some cases, various databases which are stored in the computer system.

First, with the equation input application installed in a server, a function of inputting an equation may be implemented by a connected terminal. That is, the server can make a user input equations on the web through the connected terminal by using cloud computing without just downloading the equation input application. Cloud computing described herein represents a computer environment in which information is permanently stored on the Internet and is temporarily stored on a client terminal such as desktop, tablet PC, laptop, netbook, or smartphone. That is, when the server provides a search engine service, the search engine service may be provided with a method in which an equation is input by a user through a connected terminal and the input equation is analyzed and set as a keyword before the search.

In addition, the description to follow is on a case where the equation input application is combined with another application. Specifically, when the equation input application is combined with a word processor, a user can input equations by using a specific menu of the word processor. In addition, the equation input application may be made in a mobilized form of an OS to be installed in a smartphone. As described above, the equation input application may be made in accordance with various OS environments such as iOS, Android, and Windows Phone 7 before being installed in the smartphone.

Equation input apparatus 100 includes a learning context recognizer 110, a target equation group extractor 120, a predicted equation provider 130, a typo indicator 140, an equation builder 150, an equation layout provider 160, and an equation preview provider 170. Although it has been described that equation input apparatus 100 includes learning context recognizer 110, target equation group extractor 120, predicted equation provider 130, typo indicator 140, equation autocompleting unit or equation builder 150, equation layout provider 160, and equation preview provider 170, this description is only for illustrative purposes. Those skilled in the art will appreciate that various modifications, additions and substitutions are possible for components of equation input apparatus 100, without departing from various characteristics of the disclosure.

In the meantime, in the present disclosure, a learning context recognizing function, performed by learning context recognizer 110, is defined hereinafter as a first function (F1) just for description convenience; a target equation group extracting function, performed by target equation group extractor 120, defined hereinafter as a second function (F2) just for convenience of describing this embodiment; a predicted equation providing function, performed by predicted equation provider 130, is defined hereinafter as a third function (F3) just for convenience of describing this embodiment; a typo indicating function, performed by typo indicator 140, is defined hereinafter as a fourth function (F4) just for convenience of describing this embodiment; an equation building function, performed by equation builder 150, is defined hereinafter as a fifth function (F5) just for convenience of describing this embodiment; an equation layout providing function, performed by equation layout provider 160, is defined hereinafter as a sixth function (F6) just for convenience of describing this embodiment; and an equation preview function, performed by equation preview provider 170, is defined hereinafter as a seventh function (F7) just for convenience of describing this embodiment.

Learning context recognizer 110 extracts learning context information regarding a learner account which is provided with learning content information. The learner account described herein represents learner identification information (ID information and password information) which can be recognized through a terminal receiving the learning content information. In addition, the learning context information includes at least one of learning field information, learning subject information, learner nationality information, learner grade information, equation type information included in a learning content, and cumulative equation information regarding equations selected by the learner. In the meantime, learning context recognizer 110 interworks with a learning providing server to extract the learning context information of the learner account provided with the learning content information. However, the present disclosure is not limited thereto. The learning content described herein includes a first language learning content, mathematics learning content, foreign language learning content and social studies/science learning content. In this case, when equation input apparatus 100 is implemented standalone, the learning content may be provided within equation input apparatus 100. However, when equation input apparatus 100 is implemented to be interworking with a separate server, the learning content may be provided through the separate server.

The first function (F1), which is the learning context recognizing function performed by the learning context recognizer 110, will be described based on an example. When a learner attempts to solve learning problem data or take a learning evaluation test in order to learn math/science content, the learner is supposed to input answer data responsively. The equation input apparatus 100 receives the inputted answer data. At this time, learning context recognizer 110 extracts the learning context information of the learner account wherein the learner receives the information of the learning contents under study.

The learning context information described herein may include 'information relating to a learning subject under study', 'learner's personal information (nationality and grade information)', 'problem-related information (information regarding the type of equations included in a passage)', and 'information of erstwhile input equations by the learner'. The 'information relating to the learning subject' includes information regarding the form of equations which are used exclusively to a specific mathematic subject. That is, in matrix, equations in bracket such as $$\begin{pmatrix} a & b \\ c & d \end{pmatrix}$$

are frequently used; in exponential and log learning units, equations with subscripts and superscripts are frequently used; and in the log unit, 'log' is used not as multiplication of variables 1×o×g but as a symbol with an independent meaning, and the 'information relating to the learning subject' includes such information. The 'learner's personal information' includes information of the learner's personal type of equations for use. That is, a range of equations can be limited based on a learning progress of a learner. For example, in the middle school math curriculum, the function symbol f(x) is barely used. In addition, nationality information of the learner may be an important reference. That is, academic achievements and learning progresses are required differently depending on grades and/or countries.

The 'problem-related information' includes variables to be input to answer data. The variables to be input to answer data described herein are variables included in problem data. That is, when the problem data includes an equation, the answer data which is input by the user includes a similar type of equation to that included in the problem data. For example, when a problem includes a rational expression, an answer includes an equation with a fraction. The 'information of erstwhile input equations' includes information relating to equations which have been input by a learner so far in learning history information of the learner. That is, based on the 'information of erstwhile input equations', the equation input apparatus 100 determines that the possibility of inputting an equation, which has been input by the learner once or more, is high; and otherwise the possibility of inputting an equation, which has not been input at all, is low. In the mean time, such information can be identified through cache memory or cookies of equation input apparatus 100.

Target equation group extractor 120 generates a target equation group generated by aggregating target mathematical symbols which are extracted in accordance with the learning context information. That is, the target equation group includes target mathematical symbols which are extracted in accordance with the learning context information. Target equation group extractor 120 presents the target equation group on a display (not shown) in the form of a view menu or through an interworking terminal. The second function (F2), which is the target equation group extracting function performed by target equation group extractor 120, will be described in more detail. The second function (F2) indicates that target equation group extractor 120 provides the learner with mathematical symbols in the form of a view menu based on the learning context information of the learner, which reduces the time required for the learner to find a mathematical symbol.

The learner might be provided with complex mathematical symbols in the form of the view menu on the display. However, when the learner is provided with all the mathematical symbols included in the entire mathematics curriculum, the learner feels inconvenient inputting an equation. To minimize the inconvenience, target equation group extractor 120 provides the learner with customized mathematical symbols, which are currently being required for the learner, based on learning context information. In other words, symbols and equation patterns are provided appropriately for each learner because they vary depending on and are limited by learning subjects and progress. For example, symbols $\int$ and $\Sigma$ are not used in the middle school curriculum. Therefore, when the learning context information is checked to find the grade of middle school, target equation group extractor 120 generates a target equation group from which symbols $\int$ and $\Sigma$ are excluded.

Predicted equation provider 130 provides a predicted mathematical symbol list related to information input or selected from the target equation group by a user command, selects an equation from the predicted mathematical symbol list and then reflects the equation in the input or selected information. Predicted equation provider 130 displays the predicted mathematical symbol list on a provided display (not shown) or through an interworking terminal. Here, the provided display of the predicted equation provider 130, the display of the target equation group extractor 120, and/or the display of one or more other components of the equation input apparatus 100 are the same display or different displays in accordance with various embodiments. The third function (F3) for providing the predicted equation performed by predicted equation provider 130 will be described in more detail. Predicted equation provider 130 performs the third function (F3) to provide mathematical symbols relating to an equation which has been input so far by a user's request. Predicted equation provider 130 performs this function (F3) to provide subfunctions including a 'symbol predicting function', 'equation form predicting function' and 'autocompleting function'.

The third predicted equation providing function performed by predicted equation provider 130 can be used in response to a learner's request. Specifically, when a specific menu is selected by a user command while an equation is being input, predicted equation provider 130 provides the learner with a list of mathematical symbols relating to an equation which has been input so far. The learner can select one of the mathematical symbols included in the list and have the mathematical symbol reflected in the equation which has been input so far. For example, one can refer to a Hangul or alphabet input function on a mobile communication terminal, Visual Assist X, Eclipse and the like. Of the subfunctions, the 'symbol predicting function' performed by predicted equation provider 130 can provide the learner with an appropriate mathematical symbol list for the learner's learning context; the 'equation form predicting function' can provide a list of overall equation forms; and the 'autocompleting function' can provide a completed form of the equation.

Typo indicator 140 checks whether equation information or text information, input or selected by a user command, is a typo or not based on prestored decision information and, when the typo is confirmed, automatically indicates a typo state of the equation information or text information. The prestored decision information described herein includes at least one of equation information included in the learning content information, text information included in learning subject information of the learning context information, and equation information or text information included in entire curriculum information which corresponds to a learner's level of the learning context information. Typo indicator 140 indicates the equation information or text information, determined as a typo, using a preset color. Typo indicator 140 automatically corrects the equation information or text information, determined as a typo, based on prestored decision information.

The fourth function (F4), which is the typo indicating function performed by typo indicator 140, will be described in more detail. When it is determined that the learner inputs the equation incorrectly, typo indicator 140 performs this function (F4) to serve to indicate the error in an equation or a text input by the learner. At this time, the wrong input can be determined by typo indicator 140 based on whether or not a character input in the equation is 'a variable provided in a problem', 'mathematical symbols relating to a learning subject' or 'mathematical symbols included in a curriculum'.

When the learner inputs incorrect information by mistake while inputting an equation or a text, typo indicator 140 automatically corrects the incorrect information into information which is presumed to be correct, referring to learning subject information, learning progress information or the like. That is, typo indicator 140 automatically corrects the incorrect information based on prestored answer data. However, at this time, the provision of reference to the prestored answer data only inspects the validity of an input equation not serving as a criterion to determine whether an answer is correct or not.

In this case, typo indicator 140 determines whether the learner inputted incorrect information by mistake or not, based on whether or not the character input in the equation is the 'variable provided in the problem', 'symbols relating to the learning subject' or 'symbols included in the curriculum'. By the criterion of 'whether or not a character input in the equation is the variable provided in the problem' for determining the character to be valid or not, typo indicator 140 determines that the character is valid if the variable used is same as 'the variable provided in the problem'. Otherwise, typo indicator 140 highlights the character with a preset color (e.g., 'red' color) to indicate that the irrelevant character is a typo to thusly allow the user to make a correction. The provision of the 'mathematical symbols relating to the learning subject' is a criterion for checking if two or more continuous inputs of characters are valid or not. When the two or more continuous characters are variables provided in a problem or instead same as a string of the symbols relating to the learning subject, typo indicator 140 determines that the characters are valid. Otherwise, typo indicator 140 highlights the characters with the preset color (e.g., 'red' color) to indicate that the characters are typos so that the user can correct the typos. Meanwhile, when the learner's information input is determined to be incorrect but is found in a similar character string relating to the learning subject, the determined incorrect information may be automatically corrected to information which is found in the similar character string. The provision of the 'symbols included in the mathematics curriculum' is a criterion based on which typo indicator 140 determines a character to be valid when the character is neither the variable provided in the problem nor relating to the learning subject but is a symbol included in the entire curriculum at the learner's level.

Equation builder 150 autocompletes the input or selected information into equation information which is most frequently used in the predicted mathematical symbol list. The fifth function (F5), which is the equation building function performed by equation builder 150, will be described in more detail. Equation builder 150 performs the fifth function (F5) to predict in advance and provide a mathematical symbol or a character string based on the learning context information and also provide the subfunctions including the 'symbol predicting function', 'equation form predicting function' and 'autocompleting function'.

The 'symbol predicting function' will be described. In mathematics, there are specific symbols which are typically used. For example, the character 'a', 'b' or 'c' is frequently used as a variable and 'x', 'y' or 'z' for the unknown. Instances of continuous inputs of characters other than the typically used ones are likely to represent certain other meaning than unknowns or variables. Representative untypical examples include trigonometric functions (sin, cos, tan) and log function (log, ln). When the learner attempts to solve a problem relating to a specific learning subject, the learner is likely to start inputting a character relating to the specific learning subject. Therefore, equation input apparatus 100 can provide in advance the learner with a predicted mathematical symbol based on answer data and learning context information.

The 'equation form predicting function' will be described. This function can predict and provide a completely built form of an equation in addition to a specific mathematical symbol. For example, when the symbol $\int$ is selected, the learner is allowed to input a subscript and a superscript; when the symbol $\Sigma$ is selected, start and end values are allowed to be inputted; and when an equation starts with the symbol $\int$, it is led to end in a form such as dx. That is, before one meaning is completed, an equation intended by a learner is recommended based on a content which has been input so far. For example, the 'autocompleting function' may be provided as long as a parenthesis is not closed, with a red closing parenthesis continuously displayed at the end of an equation which is currently being input. However, the 'autocompleting function' is not limited thereto, and may be provided in a form in which, once an opening parenthesis is input, a closing parenthesis is automatically input in advance so as to allow inputting the equation in parenthesis.

Equation layout provider 160 provides a specific equation layout corresponding to an equation included in the target equation group. The sixth function (F6), which is the specific equation layout providing function performed by equation layout provider 160, will be described in more detail. Equation layout provider 160 performs the sixth function to provide an advance equation layout in an equation input window when the equation has a complex or special form. That is, the learner only needs to bring simple equation entries into blanks of the provided layout. This relieves the inconvenience of the learner having to input complex equations. A mathematical problem involves various forms of equations which may be complex or special, when the learner can simply fill out the blanks of the prepared equation layout within the equation input window with relevant data to minimize the inconvenience of inputting such equations in full. For example, when an answer for a problem relating to a set requires the set to be expressed in the tabular form or in the set-builder form, set symbols are displayed in advance to allow inputting elements therebetween. Likewise, in a problem relating to a matrix, matrix symbols are provided in advance to allow filling a blank with relevant data.

Equation preview provider 170 provides equation information, input or selected by a user command, in a preview format. The seventh function (F7), which is the equation preview function performed by equation preview provider 170, will be described in more detail. Equation preview provider 170 performs this function to enable the learner to check and correct content, input by the learner, in real time. By first showing data input through symbols and commands to the learner, the learner can check whether an equation is being input as desired or not in real time. Specifically, a preview image is provided to show the same equation as inputted to equation input apparatus 100 and to allow the learner to make necessary corrections simply and immediately. The corrections and changes are also reflected in the preview image in real time.

Meanwhile, as described above, equation input apparatus 100 includes learning context recognizer 110, target equation group extractor 120, predicted equation provider 130, typo indicator 140, equation builder 150, equation layout provider 160, and equation preview provider 170 and may be implemented as a device or an application for a learner. Further, equation input apparatus 100 may include interworking unit 180 which interworks with an external device or software application and may be implemented as a device or application at the examiner side.

Interworking unit 180 receives the input or selected information from an interworking external device or application and transmits the input or selected information with the selected equation reflected to the external device or application. Here, the interworking external device may be one of a tablet PC, laptop computer, personal computer, smartphone, PDA and mobile communication terminal; and the interworking application may be a word processor or search algorithm.

In the meantime, equation input apparatus 100 may be implemented in the form of a module which is in a particular server and provides an equation input function to an interworking terminal. Alternatively, it may be implemented imbedded in the terminal. Here, the terminal refers to various data transmitting/receiving terminals and may be one of a tablet PC, laptop computer, personal computer, smartphone, PDA and mobile communication terminal. In other words, the terminal is meant to include a browser for carrying out communications, a memory for storing programs, and a microprocessor for executing the programs to effect operations and controls. To be more specific, the terminal is typically the personal computer, but may be any others as long as it connects to a network for server-client communications and encompasses any communicating computing devices including the notebook computer, mobile communication terminal, PDA, etc. Meanwhile, the terminal is preferably made to have a touch screen though it is not limited to that effect. In particular, the terminal in the present disclosure may be implemented as a standalone device including equation input apparatus 100. All the components of the equation input apparatus 100, such as the learning context recognizer 110, the target equation group extractor 120, the predicted equation provider 130, the typo indicator 140, the equation builder 150, the equation layout provider 160, and equation preview provider 170 are implemented by one or more processors and/or application-specific integrated circuits (ASICs).

Figure 2:
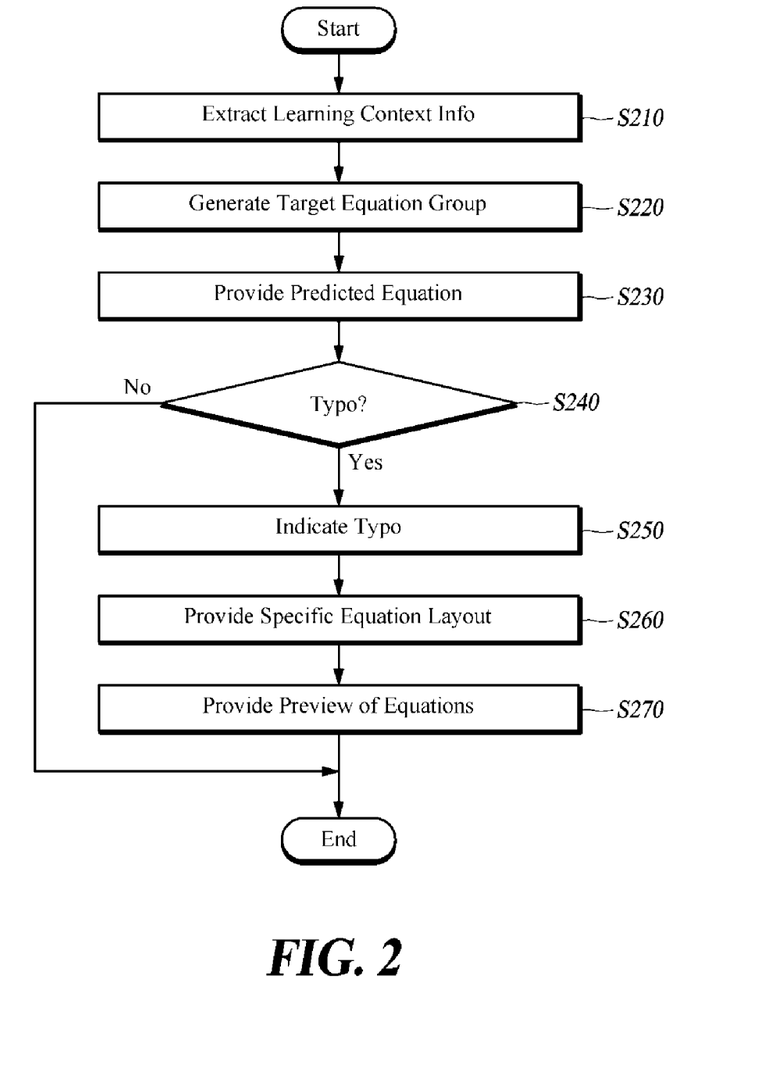
FIG. 2 is a flowchart of a method for inputting an equation according to at least one embodiment of the present disclosure.

FIG. 2 is a flowchart of a method for inputting an equation according to at least one embodiment of the present disclosure.

Equation input apparatus 100 extracts learning context information regarding a learner account which is provided with learning content information (S210). Here, the learning context information includes at least one of learning field information, learning subject information, learner nationality information, learner grade information, equation type information included in a learning content, and cumulative equation information regarding equations selected by a user. In the meantime, equation input apparatus 100 can extract learning context information regarding a learner account, which is provided with learning content information, while interworking with a learning providing server. However, the present disclosure is not limited thereto.

Equation input apparatus 100 generates a target equation group including target mathematical symbols which are extracted in accordance with the learning context information (S220). That is, the target equation group includes target mathematical symbols which are extracted in accordance with the learning context information. Equation input apparatus 100 displays the target equation group on a display in the form of a view menu or through an interworking terminal. Equation input apparatus 100 provides a predicted mathematical symbol list relating to information, input or selected from the target equation group by a user command, and has an equation, selected from the predicted mathematical symbol list, reflected in the input or selected information (S230). Equation input apparatus 100 displays the predicted mathematical symbol list on a provided display or through an interworking terminal. In the meantime, equation input apparatus 100 can autocomplete the input or selected information into equation information which is most frequently used in the predicted mathematical symbol list.

Equation input apparatus 100 checks whether equation information or text information, input or selected by a user command, is a typo or not based on prestored decision information. If step S240 confirms the equation information or text information is a typo, equation input apparatus 100 automatically indicates the error of the equation information or text information (S250). The prestored decision information described herein includes at least one of equation information included in the learning content information, text information included in learning subject information of the learning context information, and equation information or text information included in entire curriculum information which corresponds to a learner's level of the learning context information. Equation input apparatus 100 indicates the equation information or text information, determined as a typo, using a preset color (e.g., 'red' color). Equation input apparatus 100 automatically corrects the equation information or text information, determined as a typo, based on prestored decision information.

Equation input apparatus 100 provides a specific equation layout corresponding to an equation included in the target equation group (S260); and provides equation information, input or selected by a user command, in a preview format (S270).

FIG. 2 illustrates that step S210 to step S270 are sequentially performed, but this is just one example of the technical idea of the present disclosure. Those skilled in the art will appreciate that various modifications, additions and substitutions are possible without departing from various characteristics of the disclosure, for example, one or more of steps S210 to S270 can be performed in parallel. Therefore, FIG. 2 is not limited to the time-series order.

The method for inputting the equation as described above and shown in FIG. 2 may be embodied as a program stored in a non-transitory computer readable media. The computer-readable recording media storing the program for realizing the method for inputting the equation according to at least one embodiment of the present disclosure may be any data storage device that can store data which can be thereafter read by a computer system.

Figure 3:
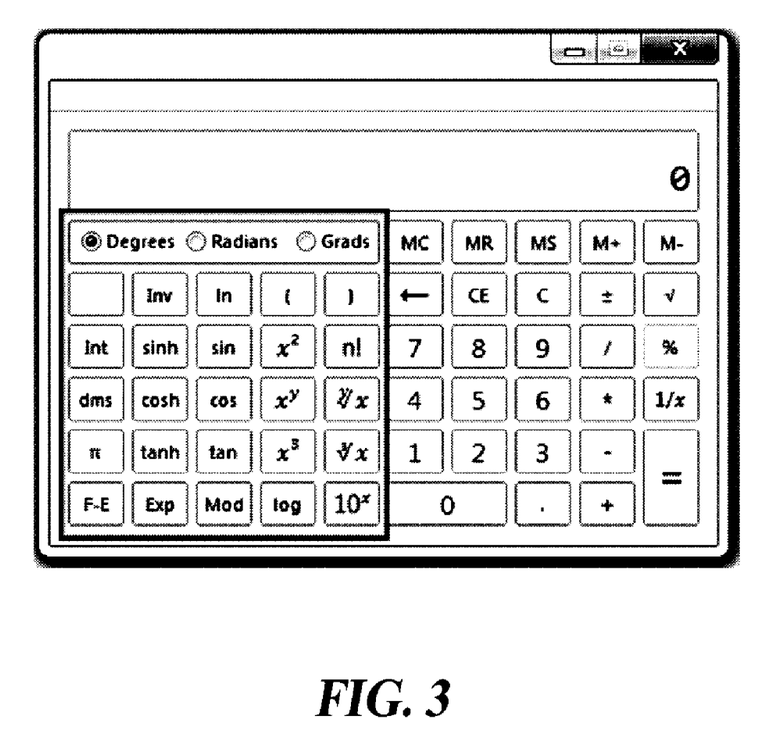
FIG. 3 is an exemplary diagram of apparatus for inputting an equation according to at least one embodiment of the present disclosure.

FIG. 3 is an exemplary diagram of apparatus for inputting an equation according to at least one embodiment of the present disclosure.

Equation input apparatus 100 generates a target equation group including target mathematical symbols which are extracted in accordance with the learning context information; and, as shown in FIG. 3, presents the target equation group on a display in the form of a view menu or through an interworking terminal.

To extract the target equation group, equation input apparatus 100 carries out the aforementioned second function (F2) to provide a learner with mathematical symbols in the form of a view menu based on learning context information of the learner, which reduces the time required to find a mathematical symbol.

Equation input apparatus 100 provides the learner with complex mathematical symbols in the form of the view menu. However, when the learner is provided with all the mathematical symbols included in the entire mathematics curriculum, the learner feels inconvenient inputting an equation. Therefore, in order for the leaner to minimize inconvenience when inputting the equation, equation input apparatus 100 provides the learner with mathematical symbols, which are currently being required for the learner, based on learning context information. That is, appropriate symbols and equation patterns are customized and provided for each learner because the symbols and patterns vary depending on and are limited by learning subjects and progress. For example, it is assumed that symbols ∫ and Σ are not used in the middle school curriculum. Therefore, when the grade is middle school as a result of checking learning context information, target equation group extractor 120 generates a target equation group from which symbols ∫ and Σ are excluded.

Figure 4:
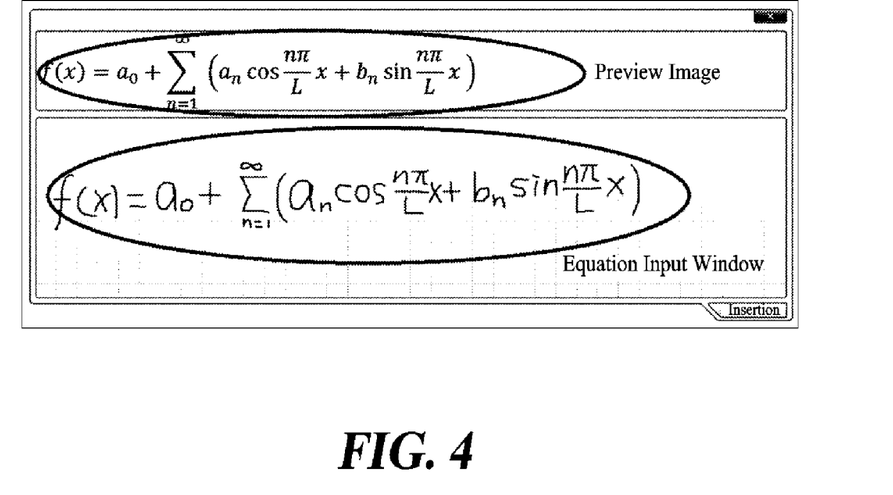
FIG. 4 is an exemplary diagram for illustrating equation information in a preview format in accordance with at least one embodiment of the present disclosure.

FIG. 4 is an exemplary diagram for illustrating equation information in a preview format in accordance with at least one embodiment of the present disclosure.

As shown in FIG. 4, equation input apparatus 100 provides equation information, input or selected by a user command, in a preview format. In the seventh function (F7) of providing an equation preview performed by equation input apparatus 100, a learner can check and correct content, input by the learner, through the interworking terminal in real time. By displaying information input through symbols and commands as the preview, the learner can check in real time whether an equation is being input as desired or not. That is, an equation which is displayed in a preview image is a value which is input to equation input apparatus 100 and can be simply corrected immediately to fit the needs of the learner. The corrections and changes are also reflected in the preview image in real time.

As described above, the present disclosure is highly useful for application to configure an equation input window according to a learner's learning context based on feedback of the learner on a learning content; and to selecting one of relevant mathematical symbols saving the need to search through the entire mathematics curriculum for the purpose of inputting the equation.

According to the present disclosure as described above, a learner is provided in the event of inputting answer data upon receiving a supply of learning problem data within a learning content, with an extraction of mathematical symbols that is exclusive to the learning content. In addition, according to at least one embodiment of the present disclosure as described above, the learner can select one of relevant mathematical symbols without wasting time required to search through the entire mathematical symbols within a mathematics curriculum for particular ones to input an equation. In addition, the present disclosure minimizes an extra learning process required for a learner to handle an equation editor.

In addition, according to at least one embodiment of the present disclosure as described above, a method and apparatus for inputting equations is provided for a learner; and is applicable to search algorithm, word processors, smartphones, etc. for an examiner.

The various embodiments as described above may be implemented in the form of one or more program commands that can be read and executed by a variety of computer systems and be recorded in any non-transitory, a computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present invention. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Although exemplary embodiments of the present disclosure have been described for illustrative purposes, those skilled in the art will appreciate that various modifications, additions and substitutions are possible, without departing from the subject matter, the spirit and scope of this disclosure. Therefore, exemplary embodiments of the present disclosure have been described for the sake of brevity and clarity. Accordingly, one of ordinary skill would understand the scope of the disclosure is not limited by the explicitly described above embodiments but by the claims and equivalents thereof.

The invention claimed is:

1. An equation input apparatus, comprising:
    a learning context recognizer configured to extract learning context information based on a learner account of a learner, wherein the learner account is provided with learning content information;
    a target equation group extractor configured to generate a target equation group including target mathematical symbols based on the extracted learning context information;
    a predicted equation provider configured to
        predict a predicted mathematical symbol list relating to information inputted or selected, by a learner command of the learner, from the target equation group, and
        provide an equation selected, by the learner, from the predicted mathematical symbol list; and
    a typo indicator configured to check whether equation information or text information inputted or selected by the learner command is a typo or not based on prestored decision information and, if the typo is confirmed, to automatically indicate a typo state of the equation information or text information, wherein the extracted learning context information includes at least one of learning field information, learning subject information, learner nationality information of the learner, learner grade information of the learner, equation type information included in a relevant learning content, and cumulative equation information regarding equations selected by the learner, and wherein the prestored decision information includes at least one of equation information included in the learning content information, text information included in learning subject information of the learning context information, and equation information or text information included in entire curriculum information which corresponds to the learner's level of the learning context information.

2. The equation input apparatus of claim 1, wherein the typo indicator is configured to indicates the equation information or text information, determined as the typo, using a preset color.

3. The equation input apparatus of claim 1, wherein the typo indicator is configured to automatically correct the equation information or text information, determined as the typo, based on the prestored decision information.

4. The equation input apparatus of claim 1, further comprising: an equation builder configured to autocomplete the inputted or selected information into equation information which is most frequently used in the predicted mathematical symbol list.

5. The equation input apparatus of claim 1, further comprising: an equation layout provider configured to provide a specific equation layout in accordance with an equation included in the target equation group.

6. The equation input apparatus of claim 1, further comprising: an equation preview provider configured to provide equation information, inputted or selected by the learner command, in a preview format.

7. The equation input apparatus of claim 1, wherein the target equation group extractor is configured to display, in the form of a view menu, the target equation group.

8. The equation input apparatus of claim 1, wherein the predicted equation provider is configured to presents the predicted mathematical symbol list on a display.

9. An equation input apparatus, comprising:
a learning context recognizer configured to extract learning context information based on a learner account of a learner, wherein the learner account is provided with learning content information;
a target equation group extractor configured to generate a target equation group including target mathematical symbols based on the extracted learning context information;
a predicted equation provider configured to
    predict a predicted mathematical symbol list relating to information inputted or selected, by a learner command of the learner, from the target equation group, and
    provide an equation selected, by the learner, from the predicted mathematical symbol list;
a typo indicator configured to check whether equation information or text information inputted or selected by the learner command is a typo or not based on prestored decision information and, if the typo is confirmed, to automatically indicate a typo state of the equation information or text information;
an equation builder configured to autocomplete the inputted or selected information into equation information which is most frequently used in the predicted mathematical symbol list;
an equation layout provider configured to provide a specific equation layout in accordance with an equation included in the target equation group; and
an equation preview provider configured to provide equation information, inputted or selected by the learner command, in a preview format,
wherein the extracted learning context information includes at least one of learning field information, learning subject information, learner nationality information of the learner, learner grade information of the learner, equation type information included in a relevant learning content, and cumulative equation information regarding equations selected by the learner, and
wherein the prestored decision information includes at least one of equation information included in the learning content information, text information included in learning subject information of the learning context information, and equation information or text information included in entire curriculum information which corresponds to the learner's level of the learning context information.

* * * * *